(12) United States Patent
Lee

(10) Patent No.: US 10,118,500 B2
(45) Date of Patent: Nov. 6, 2018

(54) BATTERY CAPACITY ESTIMATION BASED ON OPEN-LOOP AND CLOSED-LOOP MODELS

(71) Applicant: Ford Global Technologies, LLC, Dearborn, MI (US)

(72) Inventor: Tae-Kyung Lee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 148 days.

(21) Appl. No.: 15/064,639

(22) Filed: Mar. 9, 2016

(65) Prior Publication Data
US 2017/0259688 A1 Sep. 14, 2017

(51) Int. Cl.
| | | |
|---|---|---|
| *H02J 7/00* | (2006.01) | |
| *B60L 11/00* | (2006.01) | |
| *H01M 10/48* | (2006.01) | |
| *H01M 10/44* | (2006.01) | |
| *B60L 11/18* | (2006.01) | |
| *H01M 10/42* | (2006.01) | |

(52) U.S. Cl.
CPC ......... *B60L 11/1862* (2013.01); *H01M 10/44* (2013.01); *H02J 7/0026* (2013.01); *H01M 2010/4271* (2013.01); *H01M 2220/20* (2013.01)

(58) Field of Classification Search
CPC ... H02J 7/0026; B60L 11/1862; H01M 10/48; H01M 10/44; H01M 2010/4271; H01M 2220/20
USPC .................. 320/109, 104, 112, 132
See application file for complete search history.

(56) References Cited

U.S. PATENT DOCUMENTS

| | | | | |
|---|---|---|---|---|
| 4,388,618 A | * | 6/1983 | Finger ................ | G01R 31/3617 320/DIG. 21 |
| 6,453,249 B1 | * | 9/2002 | Shibutani ........... | G01R 31/3679 320/132 |
| 8,706,333 B2 | | 4/2014 | Li | |
| 9,091,735 B2 | | 7/2015 | Wang et al. | |
| 9,539,912 B2 | * | 1/2017 | Li ......................... | B60L 11/123 |
| 9,716,294 B2 | * | 7/2017 | Li ......................... | H02J 7/0008 |
| 9,895,993 B2 | * | 2/2018 | Kishida ............... | B60L 11/1861 |
| 9,997,933 B2 | * | 6/2018 | Huang ................. | H02J 7/0029 |

(Continued)

FOREIGN PATENT DOCUMENTS

| | | |
|---|---|---|
| EP | 2930819 A1 | 10/2015 |
| JP | 2002174328 A * | 6/2002 ......... F16H 57/0434 |

OTHER PUBLICATIONS

He W et al. ("State of charge estimation for electric vehicle batteries using unscented kalman filtering", Microectron Reliab (2013), http://dx.doi.org/10.1016/j.microrel.2012.11.010).*

(Continued)

*Primary Examiner* — Phallaka Kik
(74) *Attorney, Agent, or Firm* — Brooks Kushman P.C.

(57) ABSTRACT

A vehicle power system may include a controller programmed to output an electric only range indicator based on a change in capacity of a traction battery derived from open-loop and closed-loop estimates of change in state of charge of the traction battery. The change in capacity may be proportional to a ratio of the open-loop estimate to the closed-loop estimate. The closed-loop estimate may contain information indicative of the change in capacity. The open-loop estimate may contain information indicative of an initial capacity of the traction battery.

15 Claims, 5 Drawing Sheets

(56) References Cited

U.S. PATENT DOCUMENTS

| | | | |
|---|---|---|---|
| 2005/0068007 A1* | 3/2005 | Prema | B60K 6/445 |
| | | | 320/132 |
| 2006/0202857 A1* | 9/2006 | Kawahara | G01R 31/3624 |
| | | | 340/870.02 |
| 2007/0294016 A1* | 12/2007 | Braun | B60K 6/48 |
| | | | 701/67 |
| 2008/0030169 A1* | 2/2008 | Kamishima | G01R 31/361 |
| | | | 320/134 |
| 2008/0278119 A1* | 11/2008 | Veselic | H02J 7/0022 |
| | | | 320/161 |
| 2009/0278500 A1* | 11/2009 | To | B60L 11/1851 |
| | | | 320/134 |
| 2010/0194398 A1* | 8/2010 | Kawasumi | H01M 2/34 |
| | | | 324/430 |
| 2011/0309798 A1* | 12/2011 | Hara | H01M 4/131 |
| | | | 320/134 |
| 2012/0179319 A1* | 7/2012 | Gilman | B60W 50/0097 |
| | | | 701/22 |
| 2013/0006454 A1* | 1/2013 | Li | B60W 10/26 |
| | | | 701/22 |
| 2013/0013141 A1* | 1/2013 | Neiss | B60K 6/48 |
| | | | 701/22 |
| 2013/0278223 A1* | 10/2013 | Li | H01M 10/48 |
| | | | 320/136 |
| 2014/0239915 A1 | 8/2014 | Takahashi | |
| 2014/0244225 A1 | 8/2014 | Balasingam et al. | |
| 2015/0081122 A1* | 3/2015 | Yonetani | G06Q 50/06 |
| | | | 700/291 |
| 2015/0081237 A1 | 3/2015 | Ye et al. | |
| 2015/0162649 A1* | 6/2015 | Bae | H01M 10/484 |
| | | | 429/91 |
| 2015/0301117 A1 | 10/2015 | Wakasugi et al. | |
| 2015/0303719 A1* | 10/2015 | Takahashi | H02J 3/32 |
| | | | 320/134 |
| 2015/0372510 A1* | 12/2015 | Murata | H02J 7/007 |
| | | | 320/101 |
| 2016/0064979 A1* | 3/2016 | Huang | H02J 7/0055 |
| | | | 320/114 |
| 2016/0111990 A1* | 4/2016 | Books | B60L 11/02 |
| | | | 322/23 |
| 2016/0176311 A1* | 6/2016 | Liggins | B60K 35/00 |
| | | | 324/435 |
| 2016/0226291 A1* | 8/2016 | Kratzer | B60L 3/12 |
| 2016/0243959 A1* | 8/2016 | Kishida | B60L 11/1861 |
| 2017/0232863 A1* | 8/2017 | Friedrich | B60L 11/1866 |
| | | | 320/134 |

OTHER PUBLICATIONS

Yan et al. ("Robust State of Charge Estimation for Hybrid Electric Vehicles: Framework and Algorithms", Energies, Sep. 30, 2010, pp. 1654-1672).*

Kim et al., "Real-Time State of Charge and Electrical Impedance Estimation for Lithium-ion Batteries Based on a Hybrid Battery Model", IEEE, 2013, pp. 563-568.*

He et al. "State-of-Charge Estimation of the Lithium-Ion Battery Using an Adaptive Extended Kalman Filter Based on an Improved Thevenin Model", IEEE Transactions on Vehicular Technology, vol. 60, No. 4, May 2011, pp. 1461-1469.*

Yuan et al.,"State of Charge Estimation Using the Extended Kalman Filter for Battery Management Systems Based on the ARX Battery Model", Energies, Jan. 17, 2013, pp. 444-470.*

Wang et al., "State of Charge Estimation for Lithium-Ion Batteries Based on a Nonlinear Fractional Model", IEEE Transaction on Control Systems Technology, 2015, pp. 1-9.*

Zhao et al., "State-of-Charge Estimation for Lithium-ion Batteries Using a Multi-state Closed-loop Observer", Journal of Power Electronics, vol. 14, No. 5, pp. 1038-1046, Sep. 2014.*

Kipping et al., DE 102010010149 A1, abstract only, published Sep. 8, 2011.*

* cited by examiner

US 10,118,500 B2

BATTERY CAPACITY ESTIMATION BASED ON OPEN-LOOP AND CLOSED-LOOP MODELS

TECHNICAL FIELD

This application is generally related to state of charge estimation to determine battery capacity estimation using open-loop and closed-loop methods.

BACKGROUND

Hybrid-electric and pure electric vehicles rely on a traction battery to provide power for propulsion and may also provide power for some accessories. The traction battery typically includes a number of battery cells connected in various configurations. To ensure optimal operation of the vehicle, various properties of the traction battery may be monitored. One useful property is the battery state of charge (SOC) which indicates the amount of charge stored in the battery. The SOC may be calculated for the traction battery as a whole and for each of the cells. The SOC of the traction battery provides an indication of the charge remaining. The SOC for each individual cell provides information for balancing the SOC between the cells. In addition to the SOC, battery allowable charging and discharging power limits may be used to determine the range of battery operation and to prevent excessive battery operation.

SUMMARY

A vehicle power system may include a controller programmed to output an electric only range indicator based on a change in capacity of a traction battery derived from open-loop and closed-loop estimates of change in state of charge of the traction battery. The change in capacity may be proportional to a ratio of the open-loop estimate to the closed-loop estimate. The closed-loop estimate may contain information indicative of the change in capacity. The open-loop estimate may contain information indicative of an initial capacity of the traction battery. The change in capacity may be an average of a plurality of changes in capacity each associated with a change in state of charge event.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
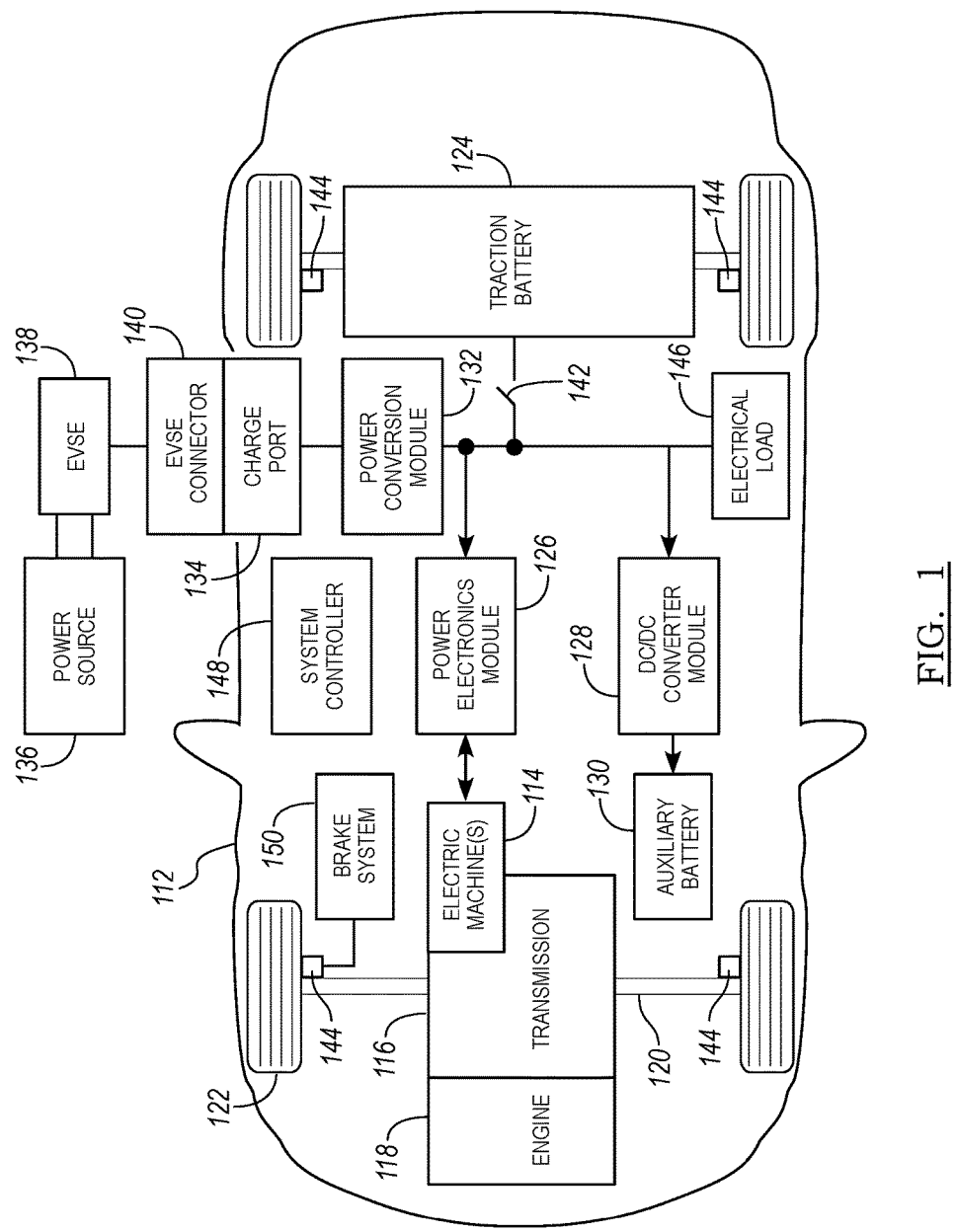
FIG. 1 is a diagram of a hybrid vehicle illustrating typical drivetrain and energy storage components.

FIG. 1 depicts a typical plug-in hybrid-electric vehicle (HEV). A typical plug-in hybrid-electric vehicle 112 may comprise one or more electric machines 114 coupled to a hybrid transmission 116. The electric machines 114 may be capable of operating as a motor or a generator. In addition, the hybrid transmission 116 is coupled to an engine 118. The hybrid transmission 116 is also coupled to a drive shaft 120 that is coupled to the wheels 122. The electric machines 114 can provide propulsion and deceleration capability when the engine 118 is turned on or off. The electric machines 114 also act as generators and can provide fuel economy benefits by recovering energy that would normally be lost as heat in the friction braking system. The electric machines 114 may also reduce vehicle emissions by allowing the engine 118 to operate at more efficient conditions (engine speeds and loads) and allowing the hybrid-electric vehicle 112 to be operated in electric mode with the engine 118 off under certain conditions.

A traction battery or battery pack 124 stores energy that can be used by the electric machines 114. A vehicle battery pack 124 typically provides a high voltage DC output. The traction battery 124 is electrically connected to one or more power electronics modules. One or more contactors 142 may isolate the traction battery 124 from other components when opened and connect the traction battery 124 to other components when closed. The power electronics module 126 is also electrically connected to the electric machines 114 and provides the ability to bi-directionally transfer energy between the traction battery 124 and the electric machines 114. For example, a typical traction battery 124 may provide a DC voltage while the electric machines 114 may use a three-phase AC current to function. The power electronics module 126 may convert the DC voltage to a three-phase AC current used by the electric machines 114. In a regenerative mode, the power electronics module 126 may convert the three-phase AC current from the electric machines 114 acting as generators to the DC voltage used by the traction battery 124. The description herein is equally applicable to a pure electric vehicle. For a pure electric vehicle, the hybrid transmission 116 may be a gear box connected to an electric machine 114 and the engine 118 may not be present.

In addition to providing energy for propulsion, the traction battery 124 may provide energy for other vehicle electrical systems. A vehicle may include a DC/DC converter module 128 that converts the high voltage DC output of the traction battery 124 to a low voltage DC supply that is compatible with other vehicle loads. Other high-voltage electrical loads 146, such as compressors and electric heaters, may be connected directly to the high-voltage without the use of a DC/DC converter module 128. The electrical loads 146 may have an associated controller that operates the electrical load 146 when appropriate. The low-voltage systems may be electrically connected to an auxiliary battery 130 (e.g., 12V battery).

The vehicle 112 may be an electric vehicle or a plug-in hybrid vehicle in which the traction battery 124 may be recharged by an external power source 136. The external power source 136 may be a connection to an electrical outlet. The external power source 136 may be electrically connected to electric vehicle supply equipment (EVSE) 138. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically connected to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components that work cooperatively to operate the wheel brakes 144. For simplicity, the figure depicts one connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 to decelerate or control the vehicle. The brake system 150 may respond to driver commands and may also operate autonomously to implement features such as stability control. The controller of the brake system 150 may implement a method of applying a requested brake force when requested by another controller or sub-function.

The various components discussed may have one or more associated controllers to control and monitor the operation of the components. The controllers may communicate via a serial bus (e.g., Controller Area Network (CAN)) or via discrete conductors. In addition, a system controller 148 may be present to coordinate the operation of the various components. A traction battery 124 may be constructed from a variety of chemical formulations. Typical battery pack chemistries may be lead acid, nickel-metal hydride (NIMH) or Lithium-Ion.

Figure 2:
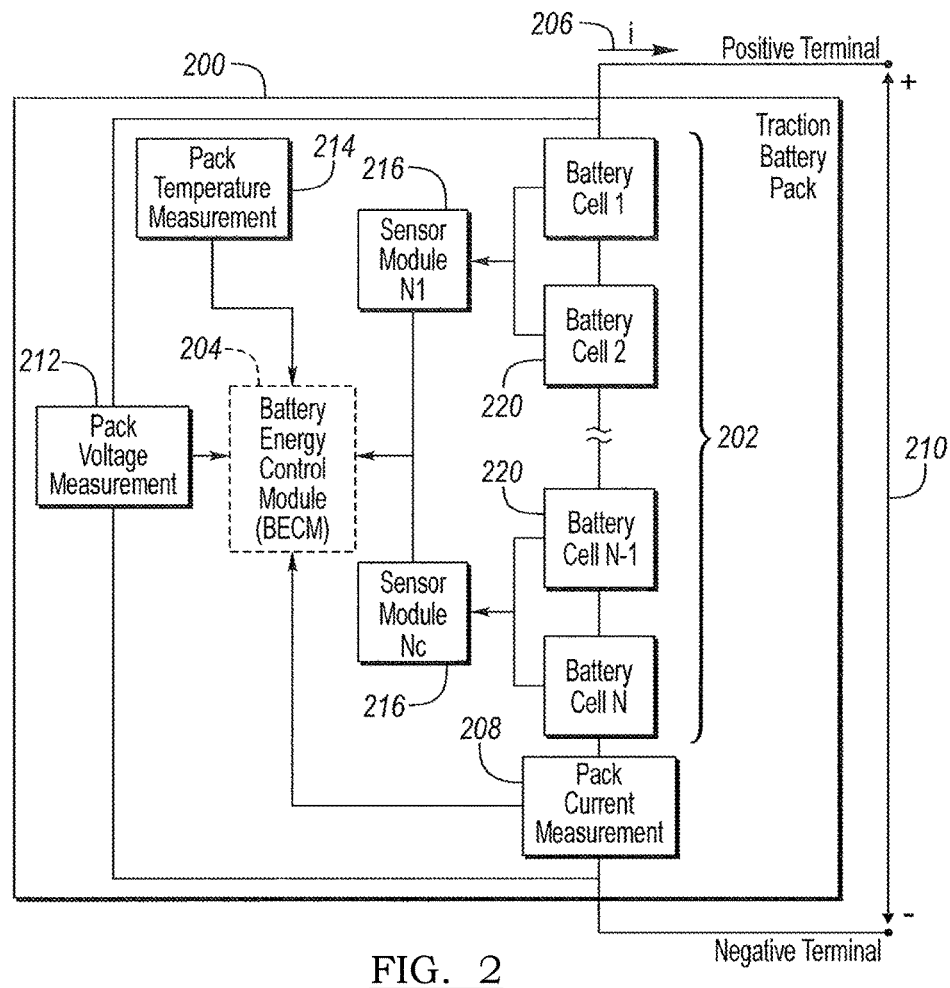
FIG. 2 is a diagram of a possible battery pack arrangement comprised of multiple cells, and monitored and controlled by a Battery Energy Control Module.

FIG. 2 shows a typical traction battery pack 200 in a simple series configuration of N battery cells 202. Battery packs 200, may be composed of any number of individual battery cells connected in series or parallel or some combination thereof. A typical system may have a one or more controllers, such as a Battery Energy Control Module (BECM) 204 that monitors and controls the performance of the traction battery 200. The BECM 204 may monitor several battery pack level characteristics such as pack current charge and discharge 206, having respective charge and discharge limits, that may be monitored by a pack current measurement module 208, pack voltage 210 that may be monitored by a pack voltage measurement module 212 and pack temperature that may be monitored by a pack temperature measurement module 214. The BECM 204 may have non-volatile memory such that data may be retained when the BECM 204 is in an off condition. Retained data may be available upon the next ignition cycle. A battery management system may be comprised of the components other than the battery cells and may include the BECM 204, measurement sensors and modules (208, 212, 214), and sensor modules 216. The function of the battery management system may be to operate the traction battery in a safe and efficient manner.

In addition to the pack level characteristics, there may be battery cell 220 level characteristics that are measured and monitored. For example, the voltage, current, and temperature of each cell 220 may be measured. A system may use a sensor module 216 to measure the characteristics of individual battery cells 220. Depending on the capabilities, the sensor module 216 may measure the characteristics of one or multiple of the battery cells 220. The battery pack 200 may utilize up to $N_c$ sensor modules 216 to measure the characteristics of each of the battery cells 220. Each sensor module 216 may transfer the measurements to the BECM 204 for further processing and coordination. The sensor module 216 may transfer signals in analog or digital form to the BECM 204. In some embodiments, the functionality of the sensor module 216 may be incorporated internally to the BECM 204. That is, the sensor module 216 hardware may be integrated as part of the circuitry in the BECM 204 wherein the BECM 204 may handle the processing of raw signals.

The battery cell 200 and pack voltages 210 may be measured using a circuit in the pack voltage measurement module 212. The voltage sensor circuit within the sensor module 216 and pack voltage measurement circuitry 212 may contain various electrical components to scale and sample the voltage signal. The measurement signals may be routed to inputs of an analog-to-digital (A/D) converter within the sensor module 216, the sensor module 216 and BECM 204 for conversion to a digital value. These components may become shorted or opened causing the voltage to be measured improperly. Additionally, these problems may occur intermittently over time and appear in the measured voltage data. The sensor module 216, pack voltage sensor 212 and BECM 204 may contain circuitry to ascertain the status of the voltage measurement components. In addition, a controller within the sensor module 216 or the BECM 204 may perform signal boundary checks based on expected signal operating levels.

Closed Loop SOC Estimation

Figure 3:
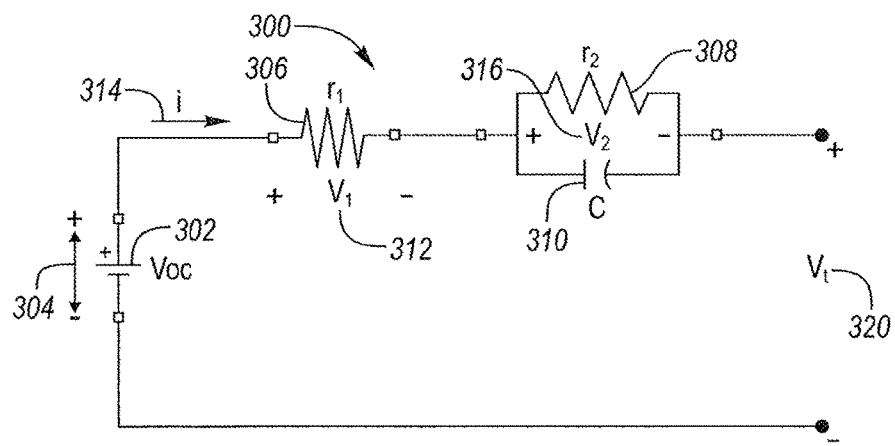
FIG. 3 is a diagram of an example battery cell equivalent circuit with one RC circuit.

A battery cell may be modeled in a variety of ways. For example, a battery cell may be modeled as an equivalent circuit. FIG. 3 shows one possible battery cell equivalent circuit model (ECM) 300, called a simplified Randles circuit model. A battery cell may be modeled as a voltage source 302 having an open circuit voltage ($V_{oc}$) and equivalent circuits (300 and 308). The impedance may be comprised of one or more resistances (306 and 308) and a capacitance 310. The $V_{oc}$ 304 represents the open-circuit voltage (OCV) of the battery expressed as a function of a battery state of charge (SOC) and temperature. The model may include an internal resistance, $r_1$ 306, a charge transfer resistance, $r_2$ 308, and a double layer capacitance, C 310. The voltage $V_1$ 312 is the voltage drop across the internal resistance 306 due to current 314 flowing from the voltage source 302. The voltage $V_2$ 316 is the voltage drop across the parallel combination of $r_2$ 308 and C 310 due to current 314 flowing through the parallel combination. The voltage $V_t$ 320 is the voltage across the terminals of the battery (terminal voltage). The parameter values $r_1$, $r_2$, and C may be known or unknown. The value of the parameters may depend on the cell design and the battery chemistry.

Because of the battery cell impedance, the terminal voltage, $V_t$ 320, may not be the same as the open-circuit voltage, $V_{oc}$ 304. As typically only the terminal voltage 320 of the battery cell is accessible for measurement, the open-circuit voltage, $V_{oc}$ 304, may not be readily measurable while the battery operates. When no current 314 is flowing for a sufficiently long period of time, the terminal voltage 320 may be the same as the open-circuit voltage 304, however typically a sufficiently long period of time may be needed to allow the internal dynamics of the battery to reach a steady state. The dynamic properties or dynamics may be characterized by a frequency response, which is the quantitative measure of the output spectrum of a system or device (battery, cell, electrode or sub-component) in response to a stimulus (change in current, current profile, or other historical data on battery current). The frequency response may be decomposed into frequency components such as fast responses to a given input and slow responses to the given input. To use the battery hardware more effectively, a model that captures both fast and slow battery cell dynamics is needed. A battery cell model that is compact enough to be executed on a microcontroller, microprocessor, ASIC, or other control system and captures both fast and slow dynamics of the battery cell is used to design a closed-loop battery SOC estimator. Equivalent circuits provide one method to capture battery characteristics and reduced-order electrochemical battery models may be an alternative. As more RC elements are added to an ECM, more model parameters and state variables are required. For example, an ECM with three RC components requires seven model parameters.

Figure 4:
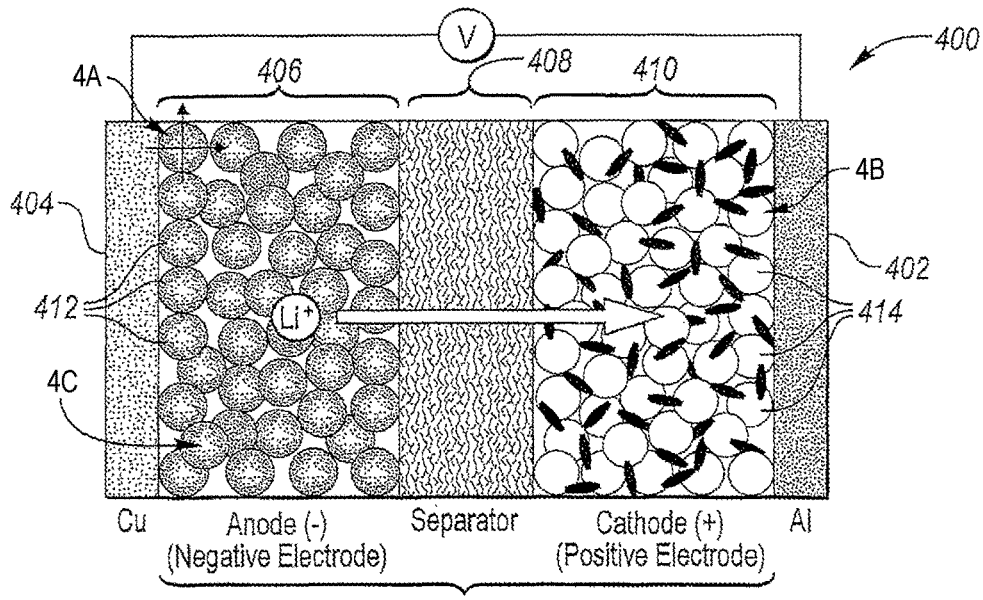
FIG. 4 is an illustration of a cross section of a Metal-ion battery with porous electrodes.
Figures 4A, 4B:
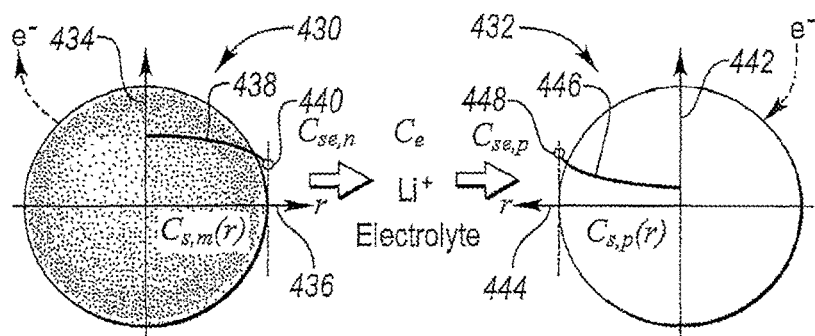
FIG. 4A is an illustration of Li-ion concentration profiles inside representative particles in the negative electrode resulting from the Li-ion diffusion process during discharging.
FIG. 4B is an illustration of Li-ion concentration profiles inside representative particles in the positive electrode resulting from the Li-ion diffusion process during discharging.

An example electrochemical battery model is disclosed as another way to model a Metal-ion battery. FIG. 4 is an illustration of the cross section of the laminated structure of a Metal-ion battery cell 400 or cell. This Metal-ion battery cell 400 may be a Li-ion battery cell. The laminated structure may be configured as a prismatic cell, a cylindrical cell or other cell structure with respect to various packaging methods. The cell geometry or physical structure may be different (e.g. cylindrical, rectangular, etc.), but the basic structure of the cell is the same. Generally, the Metal-ion cell 400, for example a Li-ion battery, includes a positive current collector 402 which is typically aluminum, but may be another suitable material or alloy, a negative current collector 404 which is typically copper, but may be another suitable material or alloy, a negative electrode 406 which is typically carbon, graphite or graphene, but may be another suitable material, a separator 408, and a positive electrode 410 which is typically a metal oxide (e.g. lithium cobalt oxide (LiCoO$_2$), Lithium iron phosphate (LiFePO$_4$), lithium manganese oxide (LMnO$_2$), Nickel Manganese Cobalt Oxide (NMC)), but may be another suitable material. Each electrode (406, 410) may have a porous structure increasing the surface area of each electrode, in which Metal-ions (e.g. Li-ions) travel across the electrode though the electrolyte and diffuse into/out of electrode solid particles (412, 414).

There are multiple ranges of time scales existent in electrochemical dynamic responses of a Metal-ion battery 400. For example with a Li-ion battery, factors which impact the dynamics include but are not limited to the electrochemical reaction in active solid particles 412 in the electrodes and the mass transport of Lithium-ion across the electrodes 416. When considering these aspects, the basic reaction in the electrodes may be expressed as

$$\Theta + Li^+ + e^- \leftrightarrows \Theta\text{-}Li \qquad (1)$$

In which $\Theta$ is the available site for intercalation, $Li^+$ is the Li-ion, $e^-$ is the electron, and $\Theta$–Li is the intercalated Lithium in the solid solution.

Figure 4C:
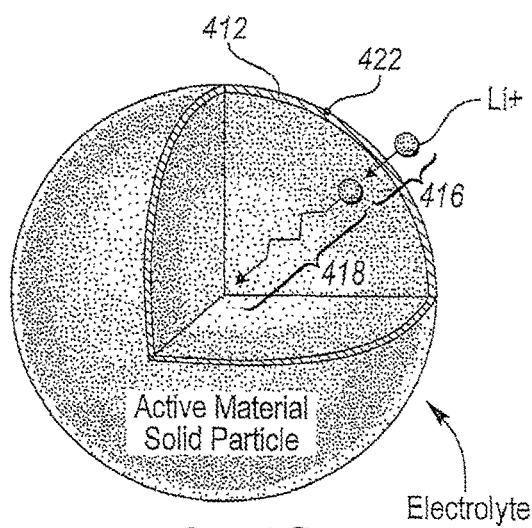
FIG. 4C is an illustration of an active material solid particle and Li-ion transfer and diffusion processes.

This fundamental reaction expressed by equation (1) is governed by multiple time scale processes. This is shown in FIG. 4C, in which the categories of the processes include charge transfer 416, diffusion 418, and polarization 420. These terms differ from the definitions used by the electrochemical society to facilitate a reduced-order electrochemical battery model derivation. Here, the charge transfer process 416 represents the Metal-ion exchange behavior across the solid-electrolyte interface (SEI) 422 at each active solid particle (412, 414). The charge transfer process is fast (e.g. less than, but not limited to, 100 milliseconds) under most cases and directly affected by the reaction rate at each electrode (406 & 410). There are multiple frequency components for the charge transfer, the charge transfer consists of both fast and slow dynamics, or in other words the charge transfer has frequency components less and greater than a predetermined frequency. The diffusion process 418 represents the Metal-ion transfer from the surface to the center of the solid particle or vice versa. The diffusion process is slow (e.g. greater than, but not limited to, 1 second) and is determined by the size and material of active solid particle (412, 414), and the Metal-ion intercalation level. There are multiple frequency components for the diffusion process, the diffusion process consists of both fast and slow dynamics, or in other words the diffusion process has frequency components less and greater than a predetermined frequency. The polarization 420 process includes all other conditions having inhomogeneous Metal-ion concentrations in the electrolyte or electrode in space. The polarization 420 caused by the charge transfer 416 and the diffusion 418 is not included in this categorization. There are multiple frequency components for the polarization, the polarization consists of both fast and slow dynamics, or in other words the polarization has frequency components less and greater than a predetermined frequency.

The anode 406 and cathode 410 may be modeled as a spherical material (i.e. spherical electrode material model) as illustrated by the anode spherical material 430 and the cathode spherical material 432. However other model structures may be used. The anode spherical material 430 has a metal-ion concentration 434 which is shown in relation to the radius of the sphere 436. The concentration of the Metal-ion 438 changes as a function of the radius 436 with a metal-ion concentration at the surface to electrolyte interface of 440. Similarly, the cathode spherical material 432 has a metal-ion concentration 442 which is shown in relation to the radius of the sphere 444. The concentration of the Metal-ion 446 changes as a function of the radius 444 with a metal-ion concentration at the surface to electrolyte interface of 448.

An electrochemical battery model may be expressed in a state-space from as $$\dot{c}_s^{eff} = Ac_s^{eff} + Bu, \qquad (2)$$

where $c_s^{eff}$ is the effective Li-ion concentration n-by-1 vector accounting for the slow-to-medium dynamics terms, A is the n-by-n system matrix that characterize the slow-to-medium dynamics of the battery, B is the n-by-1 input matrix that directly relates the input to the rate of state variables, and u is the input to the system, i.e., the battery current. A is also the function of the parameters related to battery capacity and dynamics.

An output, y, of the system may be the terminal voltage and may be expressed as:

$$y = Hc_s^{eff} + Du \qquad (3)$$

The closed-loop estimation may determine an $SOC_{CL}$ estimation of the battery from the battery model expressed in, but not limited to, eqns. (2) and (3). The closed-loop estimation, unless previously specified, may reflect the change of the battery capacity because the closed-loop estimation is based on the battery current input and the battery voltage response, which is directly affected by the battery capacity. For this reason, the $SOC_{CL}$ estimation may be used to extract the battery capacity information, if other SOC measurement is available in the system.

Open-Loop SOC Estimation

Battery state of charge may be estimated using a bookkeeping, Coulomb counting, i.e., current integration method. Other open-loop (or feed-forward) SOC estimation methods may also be used to determine $SOC_{OL}(t)$. The rate of $SOC_{OL}(t)$ with respect to the time t may be equal to the current, i(t), divided by the battery capacity $Q_{batt}$. $SOC(t_f)$ may be calculated by the sum of the initial SOC and the integral of the rate of $SOC_{OL}(t)$, as shown in $$SOC_{OL}(t_f) = SOC(t_i) + \frac{\int_{t_i}^{t_f} i(t)dt}{Q_{batt}} \qquad (4)$$

The open-loop SOC estimation may indicate the SOC at $t_f$ in relation to the original capacity of the battery, $Q_{batt}$. $SOC_{OL}$ may not detect sensor error or drift associated with the current indication or battery capacity change.

$SOC_{OL}$ and $SOC_{CL}$ may be Used to Estimate Battery Capacity

Having the subscript k represent time, a relationship may exist between the system input u(k), which is current i(k) in a battery system, and the system responses, which include the battery terminal voltage, SOC, and other measurable values. The system may be modeled in a state-space form around a reference point. For simplicity, let the system have one input and one output, i.e., SISO (single input single output) system.

$$x(k+1) = Ax(k) + Bu(k) \qquad (5)$$

$$y(k) = Cx(k) + Du(k) \qquad (6)$$

where A is the n-by-n system matrix, B is the n-by-1 input matrix, C is the 1-by-n output matrix, and D is the 1-by-1 matrix. Equations (2) and (3) may be expressed in a form of eqns. (5) and (6).

If the system is changing over time and the state-space model in eqns. (5) and (6) does not match to the changed system, a closed-loop estimator may be required to compensate the model mismatch, which is the difference between a physical plant and a system model. Therefore, the closed-loop estimator may produce the different system responses from the open-loop estimator. The difference in estimations between the closed-loop estimator and the open-loop estimator contains the system change information, and the system change information may be extracted from the difference in estimations.

Closed loop state estimator can be expressed as $$\hat{x}(k+1) = A\hat{x}(k) + L(y(k) - \hat{y}(k)) + Bu(k) \qquad (7)$$
$$= A\hat{x}(k) + L\tilde{y}(k) - Bu(k)$$

where L is the observer gain matrix.

Eqn. (7) can be manipulated as $$\hat{x}(k+1) = A\hat{x}(k) + B(B^{-1}L\tilde{y}(k) + u(k)) \qquad (8)$$
$$= A\hat{x}(k) + Bu'(k)$$

This expression shows that control inputs to the observer are adjusted to minimize the measurement error between the model and the plant, i.e., $$u'(k) = B^{-1}L\tilde{y}(k) + u(k) = a(k)u(k) \qquad (9)$$

In this system, u(k)=i(k), hence $$i'(k) = a(k)i(k) \qquad (10)$$

where a(k) is a correction factor determined by model mismatch.

The adjusted amount of the current input, $i_{adj}$, to the battery can be expressed as $$i'_{adj}(t) = \frac{Q_{init}}{Q_{new}} i(t) \qquad (11)$$

By comparing eqns. (10) and (11), $$a(k) = \frac{Q_{init}}{Q_{new}}. \qquad (12)$$

The adjusted current input $i'_{adj}(t)$ is equal to the product of the control input i(t) and the ratio between the initial battery capacity $Q_{init}$ over the new battery capacity $Q_{new}$. Equation (12) will be valid in a sense of average when the time is sufficiently long and the feedback algorithm effectively rejects the external disturbance including model parameter mismatch.

The SOC estimation from the closed-loop may be related to the SOC estimation from open-loop estimator. The battery capacity change may be estimated from the relation between the SOC estimations by closed-loop and open-loop estimators.

$$\Delta SOC_{CL}(t_f | t_i) = \frac{\int_{t_i}^{t_f} i_{adj}(t)dt}{Q_{init}} \quad (13)$$

From eqn. (11), eqn. (13) can be converted to $$\Delta SOC_{CL}(t_f | t_i) = \frac{\int_{t_i}^{t_f} i_{adj}(t)dt}{Q_{init}} = \frac{\frac{Q_{init}}{Q_{new}} \int_{t_i}^{t_f} i(t)dt}{Q_{init}} \quad (14)$$

From eqn. (4), $$\Delta SOC_{OL}(t_f | t_i) = \frac{\int_{t_i}^{t_f} i(t)dt}{Q_{init}} \quad (15)$$

From eqns. (14) and (15), the identified changed battery capacity is computed by $$\hat{Q}_{new} = Q_{init} \frac{\Delta SOC_{OL}(t_f | t_i)}{\Delta SOC_{CL}(t_f | t_i)} \quad (16)$$

An estimation of the change in battery capacity may be proportional to a ratio of the open-loop estimate, $\Delta SOC_{OL}$, to the closed-loop estimate, $\Delta SOC_{CL}$. The ratio between $\Delta SOC_{OL}$ and $\Delta SOC_{CL}$ may indicate the change ratio of the battery capacity with respect to the initial battery capacity.

For example, an open-loop estimation of SOC may indicate a 80% SOC at $t_i$ and a 70% SOC at $t_f$, which does not take into consideration the change in battery capacity. The closed-loop estimation of SOC may indicate a 70% SOC at $t_i$ and a 55% SOC at $t_f$, which is evaluated with the changed battery capacity. The $\Delta SOC_{OL}$ being 10% and the $\Delta SOC_{CL}$ being 15% results in $\hat{Q}_{new}$–2/3$Q_{init}$.

To reduce noise factors, such as measurement and process noises, the controller may be configured to recognize events, such as initial charge and discharge, and average the $\hat{Q}_{new}$ over time, as shown in equation (9).

$$\overline{Q}_{new} = \frac{1}{n} \sum_{k=1}^{n} \hat{Q}_{new}(t_k) \quad (17)$$

Updating $\hat{Q}_{new}$ during events, such as initial charge and discharge, may erroneously skew the estimated battery capacity due to temporary fluctuations in the measurement signal.

Figure 5:
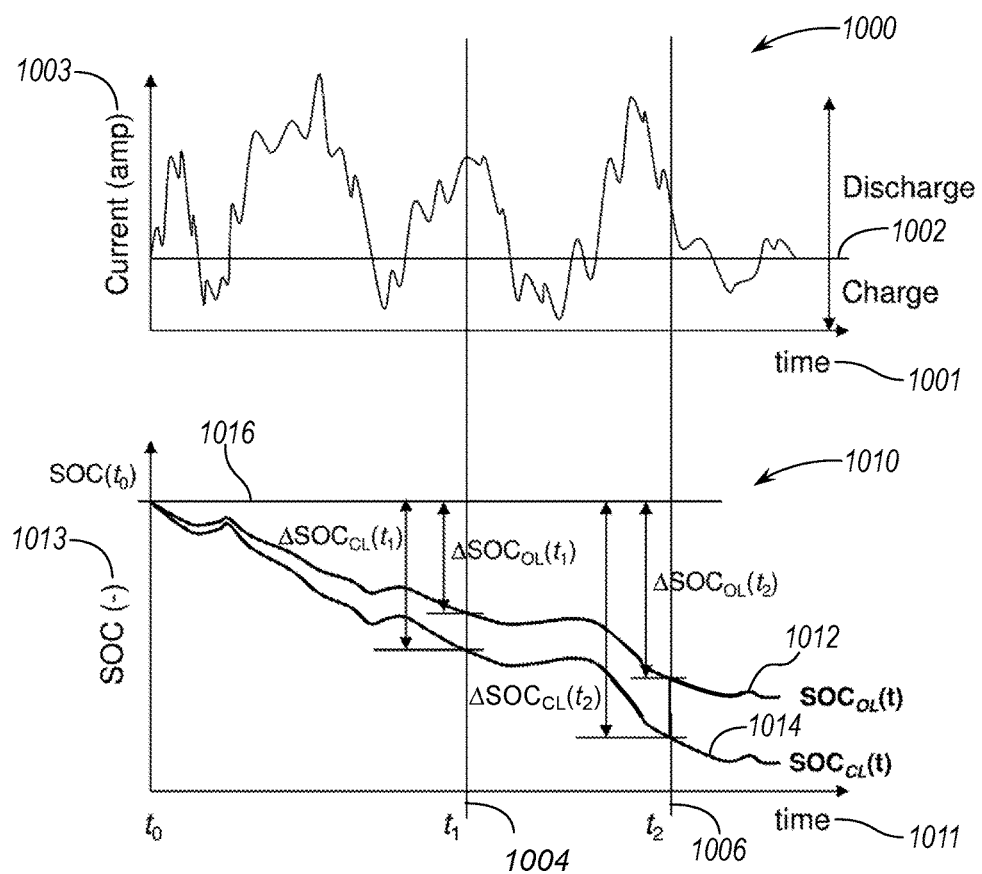
FIG. 5 is an illustration and graph of the change in SOC using open-loop and closed-loop methods to estimate a new battery capacity.

Now referring to FIG. 5, graph 1000 depicts battery current usage over time. The y-axis 1003 represents the current consumption over time, as depicted by the x-axis 1001. The battery charging or discharging curve shows a natural consumption of available battery power over time. The charge/discharge line 1002 indicates the applicable battery usage state.

Figure 6:
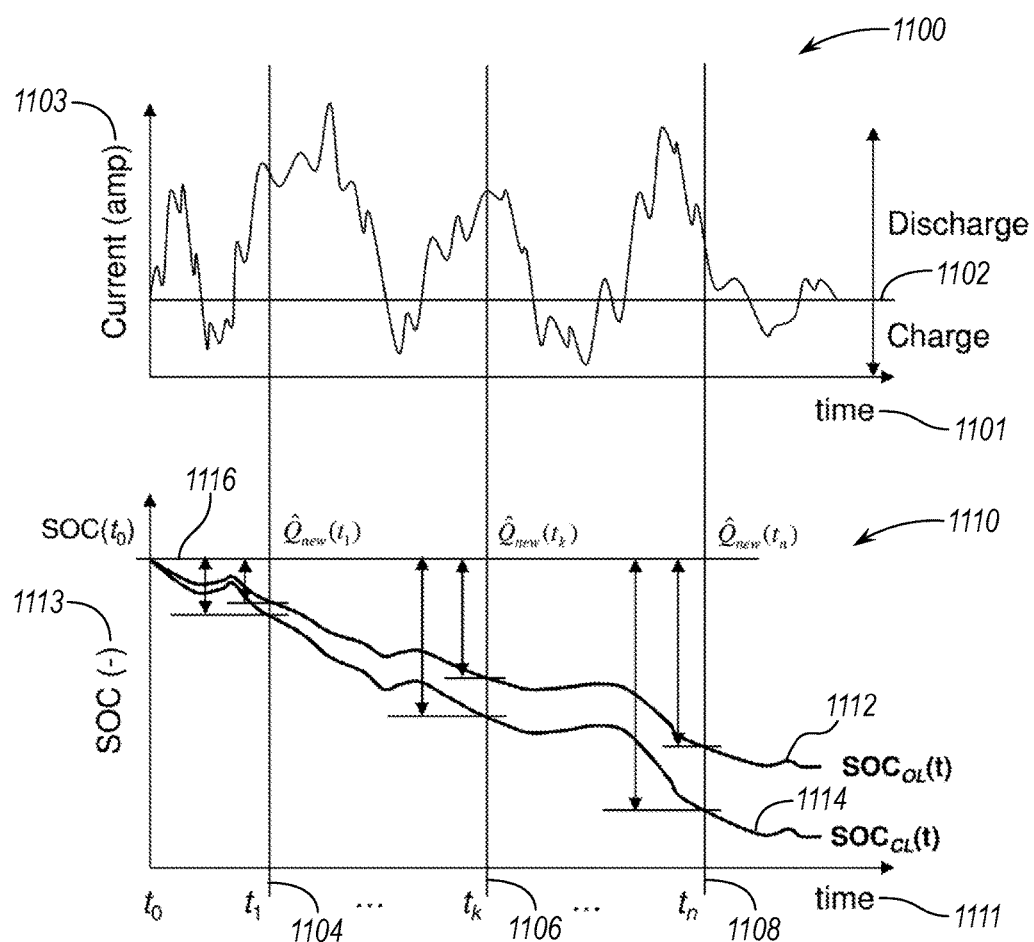
FIG. 6 is an illustration and graph of the change in SOC using open-loop and closed-loop methods to average an estimated battery capacity.

Graph 1010 depicts battery state of charge change over time. As indicated in Equation (16), an estimated battery capacity change over time may be determined by the ratio between changes in the open-loop and closed-loop states of charge. The y-axis 1013 of graph 1010 represents the SOC over time, as depicted by the x-axis 1011. Curve 1012 is an indication of the $SOC_{OL}$. Curve 1012 may be based on an initial determination of the battery capacity, SOC($t_0$) 1016. $\Delta SOC_{OL}$ may be determined between time intervals $t_1$ 1004 and $t_2$ 1006, or between time intervals $t_0$ and $t_1$ 1004, or between time intervals $t_0$ and $t_2$ 1006. Curve 1014 is an indication of the $SOC_{CL}$. Curve 1014 may be based on the lithium-ion concentration as discussed above, or based on other model based SOC estimation approaches. $\Delta SOC_{CL}$ may be determined between time intervals $t_1$ 1004 and $t_2$ 1006, or between time intervals $t_0$ and $t_1$ 1004, or between time intervals $t_0$ and $t_2$ 1006. Equation (16) may be used to estimate a new battery capacity, $\hat{Q}_{new}$. Now referring to FIG. 6, graph 1100 depicts battery current usage over time. The y-axis 1103 represents the current consumption over time, as depicted by the x-axis 1101. The battery charging or discharging curve shows a natural consumption of available battery power over time. The charge/discharge line 1102 indicates the applicable battery usage state.

Graph 1110 depicts battery state of charge change over time. As indicated in Equation (37), an estimated battery capacity change over time may be averaged at particular times with limited estimation drift or errors. The y-axis 1113 of graph 1110 represents the SOC over time, as depicted by the x-axis 1111. Curve 1112 is an indication of the $SOC_{OL}$. Curve 1112 may be based on an initial determination of the battery capacity, SOC($t_0$) 1016. $\Delta SOC_{OL}$ may be determined between time intervals $t_1$ 1004 and $t_2$ 1006. Curve 1014 is an indication of the $SOC_{CL}$. Curve 1014 may be based on the lithium-ion concentration as discussed above. $\Delta SOC_{CL}$ may be determined between time intervals $t_1$ 1004 and $t_2$ 1006. Equation (36) may be used to estimate a new battery capacity, $\hat{Q}_{new}$ at time $t_1$ 1104, $t_k$ 1106, and $t_n$ 1108. Estimations of $\hat{Q}_{new}$ may be averaged to remove noise or other signal errors, as show in Equation (37).

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle power system comprising:
a controller programmed to output an electric only range indicator based on a change in maximum capacity of a traction battery derived from open-loop and closed-loop estimates of change in state of charge of the traction battery, and operate the traction battery according to maximum charge and discharge current limits of the traction battery.

2. The system of claim 1, wherein the change in capacity is proportional to a ratio of the open-loop estimate to the closed-loop estimate.

3. The system of claim 1, wherein the closed-loop estimate contains information indicative of the change in capacity.

4. The system of claim 1, wherein the open-loop estimate contains information indicative of an initial capacity of the traction battery.

5. The system of claim 1, wherein the change in capacity is an average of a plurality of changes in capacity each associated with a change in state of charge event.

6. A vehicle comprising:
a traction battery; and
a controller programmed to alter maximum charge and discharge current limits of the traction battery based on a change in maximum capacity of the traction battery derived from open-loop and closed-loop estimates of change in state of charge of the traction battery, and operate the traction battery according to the limits.

7. The vehicle of claim 6, wherein the change in capacity is proportional to a ratio of the open-loop estimate to the closed-loop estimate.

8. The vehicle of claim 6, wherein the closed-loop estimate contains information indicative of the change in capacity.

9. The vehicle of claim 6, wherein the open-loop estimate contains information indicative of an initial capacity of the traction battery.

10. The vehicle of claim 6, wherein the change in capacity is an average of a plurality of changes in capacity each associated with a change in state of charge event.

11. A traction battery management method comprising:
altering by a controller maximum charge and discharge power limits of a traction battery based on a change in maximum capacity of the traction battery derived from open-loop and closed-loop estimates of change in state of charge of the traction battery, and operate the traction battery according to the limits.

12. The method of claim 11, wherein the change in capacity is proportional to a ratio of the open-loop estimate to the closed-loop estimate.

13. The method of claim 11, wherein the closed-loop estimate contains information indicative of the change in capacity.

14. The method of claim 11, wherein the open-loop estimate contains information indicative of an initial capacity of the traction battery.

15. The method of claim 11, wherein the change in capacity is an average of a plurality of changes in capacity each associated with a change in state of charge event.

* * * * *